United States Patent [19]

Miyake et al.

[11] 4,016,115

[45] Apr. 5, 1977

[54] UNSATURATED POLYESTER RESIN COMPOSITION CONTAINING TITANIUM DIOXIDE

[75] Inventors: Hideo Miyake; Toshio Tsuchida, both of Otsu, Japan

[73] Assignee: Toyo Boseki Kabushiki Kaisha, Osaka, Japan

[22] Filed: Sept. 26, 1975

[21] Appl. No.: 617,172

[30] Foreign Application Priority Data

Oct. 2, 1974 Japan .......................... 49-114048

[52] U.S. Cl. .............................. 260/2.3; 260/40 R; 260/861
[51] Int. Cl.² ........................................ C08K 11/04
[58] Field of Search ................. 260/2.3, 40 R, 861, 260/873

[56] References Cited

UNITED STATES PATENTS

| | | | |
|---|---|---|---|
| 2,935,489 | 5/1960 | Bader et al. | 260/861 |
| 3,446,758 | 5/1969 | Wiener | 260/2.3 |
| 3,928,253 | 12/1975 | Thornton et al. | 260/2.3 |

OTHER PUBLICATIONS

Def. Pub. T870,014, published Jan. 1970.

*Primary Examiner*—Melvyn I. Marquis
*Assistant Examiner*—S. M. Person
*Attorney, Agent, or Firm*—Birch, Stewart, Kolasch and Birch

[57] ABSTRACT

An unsaturated polyester resin composition containing titanium dioxide excellent in the stability of dispersion of the titanium dioxide and suitable for the manufacture of opaque, molded products comprising (1) an unsaturated polyester resin containing titanium dioxide consisting of an unsaturated polyester obtained from a high molecular weight saturated polyester containing titanium dioxide as the raw material and a copolymerizable monomer and (2) at least one compound selected from the group consisting of a hydroxyalkylamine (A) having at least one amino group and at least one hydroxyl group attached to different carbon atoms thereof, a polyoxyalkyleneamine (B), a mono- or dicarboxylate (C) derived from the compound (A) and a mono- or dicarboxylate (D) derived from the compound (B).

15 Claims, No Drawings

UNSATURATED POLYESTER RESIN COMPOSITION CONTAINING TITANIUM DIOXIDE

FIELD OF THE INVENTION

The present invention relates to an unsaturated polyester resin composition containing titanium dioxide. More particularly, the present invention relates to an unsaturated polyester resin composition containing titanium dioxide stably dispersed therein which is produced from a high molecular weight saturated polyester containing titanium dioxide as the raw material.

BACKGROUND OF THE INVENTION

Usually, an unsaturated polyester resin is produced by dissolving an unsaturated polyester in at least one monomer selected from vinyl monomers, allyl monomers and other copolymerizable monomers, and when required, may be added with various additives such as, promoters, inhibitors, accelerators, thixotropic agents, thixotropic auxiliary agents, UV absorbers, fire retarding agents, pigments, waxes, or the like.

An unsaturated polyester which is one of the main two components of an unsaturated polyester resin is generally obtained from a saturated dibasic acid or its anhydride or its diester, an unsaturated dibasic acid or its anhydride and a glycol or an alkylene oxide or from an unsaturated dibasic acid or its anhydride and a glycol or an alkylene oxide.

It is also known that an unsaturated polyester is obtained from a depolycondensation product prepared from a high molecular weight saturated polyester and other raw materials required for the formation of an unsaturated polyester.

In the latter case, a polyethylene terephthalate for uses in fibers, films or molding materials or a large amount of polyethylene terephthalate wastes by-produced during the manufacture or the fabrication of the said products, is utilized as the high molecular weight saturated polyester. In many patent specifications, there is disclosed that an unsaturated polyester resin is produced from an unsaturated polyester obtained from a depolycondensation product prepared from a polyethylene terephthalate, particularly for use in fibers, as the high molecular weight saturated polyester.

The polyethylene terephthalate for use in fibers generally contains titanium dioxide of from 0.1 to 2% by weight as a delustering agent. Since the unsaturated polyester resin thus obtained inherently contains titanium dioxide, the titanium dioxide contained therein will cohere or be sedimented within a few days due to the greater gravity of titanium dioxide than that of the unsaturated polyester resin, in many cases, into a formation of a cake. Such an unsaturated polyester resin is hardly suitable for commercial uses.

SUMMARY OF THE INVENTION

Accordingly, the object of the present invention is to provide a composition which prevents the sedimentation of titanium dioxide and which maintains a stable dispersion of titanium dioxide during a long period in an unsaturated polyester resin produced from a depolycondensation product of polyethylene terephthalate for use in fibers or other high molecular weight saturated polyesters.

The present inventors have found, as the result of various research works, the composition of the present invention which maintains a stable dispersion of titanium dioxide during a long period by the presence of peculiar compounds in the unsaturated polyester resin described above.

DETAILED DESCRIPTION OF THE INVENTION

The present invention relates to an unsaturated polyester resin composition containing titanium dioxide which is produced by a combination of (1) an unsaturated polyester resin containing titanium dioxide consisting of an unsaturated polyester obtained from a high molecular weight saturated polyester containing titanium dioxide as the raw material and a copolymerizable monomer and (2) at least one compound selected from the group consisting of a hydroxyalkylamine (A) having at least one amino group and at least one hydroxyl group attached to different carbon atoms thereof, a polyoxyalkyleneamine (B), an ester (C) of the compound (A) and an ester (D) of the compound (B).

The unsaturated polyester resin composition of the present invention maintains a stable dispersion of titanium dioxide contained in the said composition for a long time and, therefore, can provide an unsaturated polyester resin containing titanium dioxide for practical use.

Examples of high molecular weight saturated polyesters containing titanium dioxide to be used as the raw material for the production of the unsaturated polyester resin in the present invention include polyethylene terephthalate, polyethylene terephthalateisophthalate, polybutylene terephthalate, polyethylenebutylene terephthalate, polyethylene naphthalate and polyethylene terephthalatenaphthalate and their wastes such as polymer pellets, fiber wastes and other wastes by-produced in the course of manufacture thereof. These high molecular weight saturated polyesters and their wastes may generally contain titanium dioxide in an amount of from 0.1 to 2% by weight. Since various types of spinning oils attach to the fiber wastes, an unsaturated polyester resin produced from these wastes as the raw materials contains such spinning oils which have been thermally and chemically influenced in the course of the production of an unsaturated polyester and, therefore, the cohesion and the sedimentation of titanium dioxide contained in the unsaturated polyester resin are accelerated. Even in this case, the unsaturated polyester resin composition of the present invention can maintain the stable dispersion of titanium dioxide for a long time. Thus, the unsaturated polyester resin composition of the present invention can be produced from any type of high molecular weight saturated polyester and its waste containing titanium dioxide as the raw material.

The unsaturated polyester which is one of the main two components of the unsaturated polyester resin of the present invention is obtained from a depolycondensation product of polyethylene terephthalate, polyethylene terephthalate isophthalate or the other high molecular weight saturated polyesters described previously and other raw materials required for the formation of an unsaturated polyester. Various processes are available for the production of the unsaturated polyester of the present invention. The production is generally carried out by a two step reaction although it may be carried out by a one step reaction.

The depolycondensation is carried out by using one or more compounds selected from the group consisting of glycols, unsaturated dibasic acids or their anhydrides, saturated dibasic acids or their anhydrides, or their esters and oligoesters thereof.

Examples of glycols which are used in the depolycondensation include ethylene glycol, propylene glycol, 1,3-propane diol, diethylene glycol, dipropylene glycol, 1,3-butylene glycol, 1,4-butane diol, 1,6-hexane diol, neopentyl glycol, cyclohexane dimethanol, 2,2,4-trimethyl-1,3-pentane diol, hydrogenated bisphenols, alkylene oxide addition products of bisphenols, alkylene oxide addition products of hydrogenated bisphenols, or the like.

Examples of saturated dibasic acids and their anhydrides include orthophthalic acid, phthalic anhydride, isophthalic acid, terephthalic acid, succinic acid, succinic anhydride, adipic acid, azelaic acid, sebacic acid, dodecanedicarboxylic acid, tetrahydroorthophthalic acid, tetrahydrophthalic anhydride, hexahydroorthophthalic acid, hexahydrophthalic anhydride, endo-cis-bicyclo [2,2,1]-5-heptene-2,3-dicarboxylic acid and its anhydride, tetrachloro- and tetrabromoorthophthalic acid and their anhydrides, 1,4,5,6,7,7-hexachloro-bicyclo [2,2,1]-5-heptene -2,3-dicarboxylic acid and its anhydride, or the like.

Examples of unsaturated dibasic acids and their anhydrides include maleic acid, maleic anhydride, fumaric acid, itaconic acid, citraconic acid, or the like.

Examples of esters and oligoesters of the aforementioned dibasic acids include monoalkyl esters, dialkyl esters and monoglycol esters, bisglycol esters and low molecular weight oligoesters which are obtained from the aforementioned dibasic acids and glycols.

These glycols may be used together with a small amount or triols or tetraols.

As the other raw material required for the formation of an unsaturated polyester, there may be used any of the glycols, the saturated dibasic acids and their anhydrides, the unsaturated dibasic acids and their anhydrides, their esters and the oligoesters thereof which are described above.

For the production of an unsaturated polyester of the present invention, there may be employed any of the following processes which are illustrated as examples:

1. Depolycondensation by a glycol

The depolycondensation of 1 mole of a high molecular weight saturated polyester by using 1.05 to 2.0 moles of a glycol is carried out at temperatures above 200° C in an atmosphere of an inert gas. The depolycondensation product thus obtained is reacted with an unsaturated dibasic acid or its anhydride or, when required, with an unsaturated dibasic acid or its anhydride together with a saturated dibasic acid and/or a glycol at temperatures of from 150° to 290° C to obtain an unsaturated polyester, wherein the amount of the unsaturated dibasic acid component is in the range of from 10 to 90% by mole on the basis of the total dibasic acid component.

This process is most preferable for the production of the unsaturated polyester of the present invention from the standpoint of a lesser occurrence of gelation, no sublimation of the raw materials and easier control of the reaction during the course of depolycondensation.

2. Depolycondensation by a saturated dibasic acid or its anhydride

The depolycondensation of a high molecular weight saturated polyester by using a saturated dibasic acid or its anhydride is carried out at temperatures above 200° C in an atmosphere of an inert gas. The product thus obtained is reacted with an unsaturated dibasic acid or its anhydride and a glycol or, when required, with an unsaturated dibasic acid or its anhydride and glycol together with a saturated dibasic acid or its anhydride to obtain an unsaturated polyester.

3. Depolycondensation by an unsaturated dibasic acid or its anhydride and a saturated dibasic acid or its anhydride The depolycondensation of a high molecular weight saturated polyester by using an unsaturated dibasic acid or its anhydride and a saturated dibasic acid or its anhydride is carried out at temperatures above 200° C in an atmosphere of an inert gas. The product thus obtained is reacted with a glycol or, when required, with a glycol together with a saturated dibasic acid or its anhydride and/or an unsaturated dibasic acid or its anhydride to obtain an unsaturated polyester.

The unsaturated polyester to be used in the present invention is not limited to those which are obtained by the processes described above.

The acid value of the unsaturated polyester of the present invention is generally in the range of from 5 to 35 and it may be fixed at a value which suits the purposes desired. The average molecular weight of the unsaturated polyester of the present invention is generally in the range of from 750 to 3,000.

Examples of copolymerizable monomers which are used in the present invention are those which are usually employed for the production of the conventional unsaturated polyester resins, including styrene type monomers such as styrene, vinyl toluene, divinyl benzene, monochlorostyrene, tert-butyl styrene, $\alpha$-methyl styrene and ethyl styrene, (meth)acrylate type monomers such as methyl methacrylate, methyl acrylate, ethyl methacrylate, ethyl acrylate, n-butyl methacrylate and n-butyl acrylate, allyl type monomers such as diallyl phthalate, diallyl isophthalate, diallyl terephalate, diallyl adipate and diallyl fumarate, dibutyl fumarate, triallylisocyanurate and vinyl acetate, or the like. The amount of the copolymerizable monomer is in the range of from 10 to 90% by weight on the basis of the unsaturated polyester resin of the present invention. Various additives such as, promotors, inhibitors, accelerators, thixotropic agents, thixotropic auxiliary agents, UV absorbers, fire retarding agents, pigments and waxes, may be incorporated, which are usually added to the conventional unsaturated polyester resins. Various fillers and reinforcements may also be combined. The hydroxyalkylamine (A) having at least one amino group and at least one hydroxyl group attached to different carbon atoms thereof to be used in the present invention is a monoamine, a diamine, a triamine and other polyamines having at least one hydroxyl alkyl group in the molecule and N-substituted derivatives of these amines, which may be expressed by the following general formulas:

monohydroxyalkyl monoamine (i)

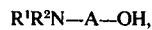

polyhydroxyalkyl monoamine (ii)

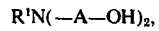

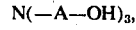

monohydroxyalkyl polyamine (iii)

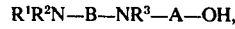

R¹R²N—B—NR³—B—NR⁴—A—OH, polyhydroxyalkyl polyamine (iv)

R¹R²N—B—N(—A—OH)₂,

HO—A—R¹N—B—NR²—A—OH,

HO—A—R¹N—B—N(—A—OH)₂, (HO—A—)₂N—B—N(—A—OH)₂,

R¹R²N—B—NR³—B—N(—A—OH)₂,

HO—A—R¹N—B—NR²—B—NR³—A—OH,

HO—A—R¹N—B—NR²—B—N(—A—OH)₂, (HO—A—)₂N—B—NR¹—B—N(—A—OH)₂, and (HO—A—)₂N—B—N(—A—OH)—B—N-(—A—OH)₂, wherein R¹, R², R³ and R⁴ are hydrogen, alkyl groups such as methyl, ethyl, n-propyl, isopropyl, n-butyl, isobutyl, sec-butyl, n-hexyl, n-octyl, 2-ethylhexyl, n-nonyl, n-decyl, lauryl, myristyl, palmityl, stearyl and oleyl, cyclohexyl, benzyl and phenyl, which may be the same or different, A is an alkylene group such as ethylene, propylene, trimethylene and tetramethylene, and B is an alkylene group such as ethylene, propylene, trimethylene and tetramethylene, cyclohexylene and phenylene.

Typical examples of the compounds (i), (ii), (iii) and (iv) of the hydroxyalkylamine (A) to be used in the present invention are ethanolamine, diethanolamine, triethanolamine, tris (2-hydroxypropyl) amine, tris (3-hydroxpropyl) amine, N-methylethanolamine, N-ethylethanolamine, N-n-propylethanolamine, N-isopropylethanolamine, N-n-butylethanolamine, N-sec-butylethanolamine, N-laurylethanolamine, N-stearylethanolamine, N-benzylethanolamine, N,N-dimethylethanolamine, N,N-diethylethanolamine, N,N-di-n-propylethanolamine, N,N-diisopropylethanolamine, N,N-di-n-butylethanolamine, N,N-di-sec-butylethanolamine, N,N-dilaurylethanolamine, N,N-distearylethanolamine, N,N-dibenzylethanolamine, N,N-dimethyl-2-hydroxypropylamine, N,N-dimethyl-3-hydroxypropylamine, N,N-di-n-propyl-2-hydroxylpropylamine, N,N-di-n-butyl-2-hydroxypropylamine, N-methyldiethanolamine, N-ethyldiethanolamine, N-n-propyldiethanolamine, N-isopropyldiethanolamine, N-n-butyldiethanolamine, N-lauryldiethanolamine, N-myristyldiethanolamine, N-oleyldiethanolamine, N-stearyldiethanolamine, N-benzyldiethanolamine, N-laurylbis (2-hydroxypropyl)amine, N-stearyl-bis (2-hydroxypropyl)amine, N,N-di-n-butyl-N'-(2-hydroxyethyl)ethylenediamine, N,N-di-n-butyl-N',N'-bis (2-hydroxypropyl)propylenediamine, N,N,N',N'-tetrakis (2-hydroxyethyl)propylenediamine, N,N,N',N',N''-pentakis (2-hydroxypropyl)diethylenetriamine, or the like.

The polyoxyalkyleneamine (B) to be used in the present invention is a monoamine, a diamine, a triamine and other polyamines having at least one polyoxyalkylene group in the molecule and N-substituted derivatives of these amines, which may be expressed by the following general formulas.

polyoxyalkylene monoamine (v) -

R¹R²N(—A—O)xH,

R¹N⟨(—A—O)xH / (—A—O)yH⟩

N⟨(—A—O)xH / (—A—O)yH / (—A—O)zH⟩, polyoxyalkylene polyamine (vi)-
R¹R²N—B—NR³(—A—O)xH, R¹R²N—B—N⟨(—A—O)xH / (—A—O)yH⟩, H(O—A—)xNR¹—B—NR²(—A—O)yH, H(O—A—)xNR¹—B—N⟨(—A—O)yH / (—A—O)zH⟩, H(O—A—)x\N—B—N/(—A—O)zH
H(O—A—)y/       \(—A—O)wH, R¹R²N—B—NR³—B—NR⁴(—A—O)xH, R¹R²N—B—NR³—B—N⟨(—A—O)xH / (—A—O)yH⟩, H(O—A—)xNR¹—B—NR²—B—NR³(—A—O)yH, H(O—A—)xNR¹—B—NR²—B—N⟨(—A—O)yH / (—A—O)zH⟩, H(O—A—)x\N—B—NR¹—B—N/(—A—O)zH
H(O—A—)y/                  \(—A—O)wH, and H(O—A—)x\N—B—N—B—N/(—A—O)wH
H(O—A—)y/    (—A—O)zH  \(—A—O)vH, wherein R¹, R², R³ and R⁴ are hydrogen, alkyl groups such as methyl, ethyl, n-propyl, isopropyl, n-butyl, isobutyl, sec-butyl, n-hexyl, n-octyl, 2-ethylhexyl, n-nonyl, n-decyl, lauryl, myristyl, palmityl, stearyl and oleyl, cyclohexyl, benzyl and phenyl, which may be the same or different, A is an alkylene group such as ethylene, propylene, trimethylene and tetramethylene, B is an alkylene group such as ethylene, propylene, trimethylene and tetramethylene, cyclohexylene and phenylene, and x is a number of from 2 to 20 and y, z, w and v are numbers of from 1 to 20, respectively. Preferably, the sum of x, y, z, w and v is a number of from 2 to 20 while x is a number of 2 or more.

Typical examples of the compounds (v) and (vi) of the polyoxyalkylene amine (B) to be used in the present invention are N-n-butyl-N-polyoxyethylene (x=2–20) amine, N-lauryl-N-polyoxyethylene (x=2–20) amine, N-myristyl-N-polyoxyethylene ($x$=2—20)amine, N-stearyl-N-polyoxyethylene($x$=2—20)amine, N,N-di-n-butyl-n-polyoxyethylene($x$=2—20)amine, N,N-dilauryl-N-polyoxyethylene ($x$=2—20)amine, N,N-distearyl-N-polyoxyethylene($x$=2—20)amine, N-n-butyl-N,N-bis(polyoxyethylene) ($x$+$y$=3—20) amine, N-lauryl-N,N-bis(polyoxyethylene) ($x$+$y$=3—20) amine, N-myristyl-N,N-bis(polyoxyethylene) ($x$+$y$=3—20)amine, N-palmityl-N,N-bis(polyoxyethylene) ($x$+$y$=3—20)amine, N-stearyl-N,N-bis(polyoxyethylene) ($x$+$y$=3—20)amine, N-stearyl-N-polyoxyethylene-N',N'-bis(polyoxyethylene) ($x$+$y$+$z$=4—20) trimethylenediamine, N,N,N',N'-tetrakis (polyoxyethylene ($x$+$y$+$z$+$w$=5—20) propylenediamine, N,N,N',N',N''-pentakis(polyoxyethylene) ($x$+$y$+$z$+$w$+$v$=6—20) diethylenetriamine, N-lauryl-N-polyoxypropylene ($x$=2—20)amine, N-lauryl-N,N-bis(polyoxypropylene) ($x$+$y$=3—20)amine, N-stearyl-N,N-bis (polyoxypropylene) ($x$+$y$=3—20)amine, N-lauryl-N-polyoxypropylene-N',N'-bis(polyoxypropylene) ($x$+$y$+$z$=4—20)trimethylenediamine, N,N,N',N',N''-pentakis(polyoxypropylene) ($x$+$y$+$z$+$w$+$v$=6—20) diethylenetriamine, or the like.

The ester (C) of the aforementioned compound (A) or the ester (D) of the aforementioned compound (B) to be used in the present invention is a monocarboxylate or a dicarboxylate derived from the said compounds (A) and (B), wherein at least one hydroxyl group of the said compounds (A) and (B) is esterified with a monocarboxylic or dicarboxylic acid.

Examples of the monocarboxylic or dicarboxylic acid to be employed for the esterification include acetic acid, propionic acid, butyric acid, caproic acid, 2-ethylcaproic acid, caprylic acid, lauric acid, myristic acid, palmitic acid, stearic acid, oleic acid, linoleic acid, acrylic acid, methacrylic acid, succinic acid, adipic acid and sebacic acid or the like.

Typical examples of the compounds (C) and (D) to be used in the present invention are diethanolamine monoacetate, diethanolamine dilaurate, triethanolamine monoacetate, triethanolamine monolaurate, triethanolamine monooleate, N,N-dimethylethanolamine acrylate, N,N-dimethylethanolamine methacrylate, N,N-diethylethanolamine diacetate, N,N-diethylethanolamine acrylate, N,N-diethylethanolamine methacrylate, N,N-diethyl-3-hydroxypropylamine acrylate, N,N-diethyl-3-hydroxypropylamine methacrylate, N,N-di-n-butylethanolamine acetate, N,N-di-n-butylethanolamine laurate, N,N-di-n-butylethanolamine adipate, N-n-butyldiethanolamine diacetate, N-n-butyldiethanolamine monolaurate, N-lauryldiethanolamine diacetate, N-lauryl-N-polyoxyethylene ($x$=2—20) amine acetate, N-lauryl-N-polyoxypropylene ($x$=2—20) amine acetate, N-lauryl-N,N-bis(polyoxyethylene) ($x$+$y$=3—20) amine diacetate, N-stearyl-N,N,-bis(polyoxyethylene) ($x$+$y$=3—20) amine diacetate, or the like.

The amount of the aforementioned compounds (A), (B), (C) and (D) to be added to the unsaturated polyester resin of the present invention may be selected according to the amount of titanium dioxide contained in the said unsaturated polyester resin and the purpose for which the unsaturated polyester resin composition of the present invention is used. The amount is generally in the range of from 0.01 to 1 part by weight on the basis of 100 parts by weight of the unsaturated polyester resin. Practically, the amount of from 0.05 to 0.5 part by weight provides an excellent result.

Addition of the aforementioned compounds (A), (B), (C) and (D) to the unsaturated polyester resin may be performed in any desired process such as, for example, in a process in which the unsaturated polyester is dissolved in a copolymerizable monomer, in a process in which various additives are added to the unsaturated polyester resin, or in a process subsequent to the addition of various additives to the unsaturated polyester resin.

The unsaturated polyester resin composition of the present invention maintains a stable dispersion of titanium dioxide contained therein for a long time, irrespectively of whether the said composition has a thixotropic property by addition of silica, asbestos or an organic thixotropic agent or not. Moreover, the stable dispersion of titanium dioxide contained in the composition of the present invention is hardly affected by the presence of the various additives such as metallic compounds represented by cobalt salts, manganese salts, vanadium salts, copper salts, zinc salts, calcium salts and potassium salts, accelerators represented by dimethyl aniline and diethyl aniline, inhibitors represented by hydroquinone, tert-butyl catechol, p-benzoquinone and hydroquinone monomethyl ether and the various additives described previously.

As described above, the excellent effect of the hydroxyalkyl amine (A), the polyoxyalkylene amine (B), the ester (C) of the compound (A) or the ester (D) of the compound (B) on a stable dispersion of titanium dioxide in the unsaturated polyester resin composition of the present invention is really peculiar. The unsaturated polyester resin of the present invention is produced from a high molecular weight saturated polyester containing titanium dioxide as the raw material. The titanium dioxide contained in the said saturated polyester, therefore, is thermally and chemically influenced during the processes of depolycondensation and polycondensation. The said compounds (A), (B), (C) and (D) of the present invention exhibit a peculiarly excellent effect on a stable dispersion of titanium dioxide contained in said unsaturated polyester resin composition as thus obtained. On the contrary when titanium dioxide is dispersed as a pigment in an unsaturated polyester resin produced by a conventional process or by a process of the present invention, addition of the compounds (A), (B), (C) or (D) of the present invention not only exhibits almost no effect but also may result in an accelerated sedimentation of titanium dioxide.

Other compounds having molecular structures rather similar to the compounds (A), (B), (C) and (D) of the present invention such as primary, secondary and tertiary amines, diamines, triamines and higher polyamines and their amides and quaternary ammonium salts, alcohols, glycols, triols and higher polyols and their esters and others, hydroxyalkylamides, polyoxyalkyleneamides and their esters, and carboxylic acids and their esters, their amides and their hydrazides, aminocarboxylic acids and their salts, alkylamine phosphonates, metal alkylaryl sulfonates, alkylmethyl taurates, dialkyl sulfosuccinates, sulfonated castor oil, polyoxyethylene monoalkylether sulfonates, lecithin, polyacrylates and their metal salts have almost or absolutely no effect on a stable dispersion of titanium dioxide contained in the unsaturated polyester resin of the present invention. Some of these other compounds described above even accelerate the cohesion and sedimentation of titanium dioxide.

Since the unsaturated polyester resin composition of the present invention contains titanium dioxide, it is not suitable for the manufacture of molded products for which transparency is required. The said composition can be extensively employed in the manufacture of all the other molded products, in which the conventional unsaturated polyester resins have been employed, such as, for example, in the manufacture of molded products by laminatings, castings, prepregs, premixes, sheet molding compounds, bulk molding compounds, matched metal die moldings, rotary moldings, cold press moldings, pultrusion moldings, injection moldings, or the like and in the manufacture of gelcoats, linings, adhesives, paints, resin concretes, resin mortar, putty, or the like.

The present invention is illustrated by the following Examples but is not limited thereto.

In the Examples, "part" means part by weight, % means % by weight, and PHR means the part by weight per 100 parts by weight of the unsaturated polyester resin.

The acid value of the unsaturated polyester and the viscosity of the unsaturated polyester resin were measured in accordance with the provision of JIS K 6901.

The stability of dispersion of titanium dioxide in the unsaturated polyester resin and the unsaturated polyester resin composition was measured by the following procedure: An unsaturated polyester resin or an unsaturated polyester resin composition was poured into a 200-ml. volumetric cylinder fitted with a stopper, was allowed to stand in a constant temperature bath and the stability of dispersion of titanium dioxide along the course of time was measured. The rating of the stability of dispersion of titanium dioxide along the course of time was determined by the following observation:

XX — The specimen became separated into a clear layer and a turbid layer and a large amount of titanium dioxide settled to the bottom within one day.

X — A large amount of titanium dioxide settled to the bottom in two to three days and the turbidity lessened.

Δ — The specimen was stable for the first two to three days out a large amount of titanium dioxide settled to the bottom within 10 days.

o — A small amount of titanium dioxide was observed to have settled after 30 days.

⊚ — A stable dispersion was maintained for more than 30 days without any change in appearance.

EXAMPLE 1

A stainless steel reactor equipped with a stirrer, a thermometer, a nitrogen gas inlet tube and a partial condenser fitted with a thermometer at the top was charged with 5,760 parts of fiber-grade polyethylene terephthalate chip (containing 0.5% of titanium dioxide) and 2,510 parts of propylene glycol. The mixture was reacted in an atmosphere of nitrogen under the pressure of 3.5 kg/cm$^2$ (gauge) at 230° C for three hours to give a depolycondensation product.

Subsequently, the product thus obtained was cooled to 150° C, mixed homogeneously with 3.5 parts of phosphorous acid and added with 3,480 parts of fumaric acid and 1.7 parts of hydroquinone. The polyesterification was carried out at 210° C to obtain an unsaturated polyester having an acid value of 12.7. The unsaturated polyester thus obtained was dissolved in styrene containing 0.0020% of hydroquinone to produce a white, turbid unsaturated polyester resin (containing 52% of styrene) having a viscosity of 1.2 poise.

A portion of the unsaturated polyester resin thus obtained was added with a compound as shown in Table 1, thoroughly mixed and poured into the cylinder described previously. The stability of the dispersion of titanium dioxide along the course of time was measured at 40° C as an accelerated test. The results obtained are shown in Table 1.

Table 1.

| Compound | Stability of dispersion of titanium dioxide Amount (PHR) | Rating of stability |
|---|---|---|
| None | 0 | X |
| N-ethylethanolamine | 0.1 | ⊚ |
| N-laurylethanolamine | 0.2 | ⊚ |
| N,N-di-n-butylethanolamine | 0.1 | ⊚ |
| N,N-dibenzylethanolamine | 0.1 | ⊚ |
| N,N-dimethyl-2-hydroxypropylamine | 0.1 | ⊚ |
| Diethanolamine | 0.1 | ⊚ |
| N-n-butyldiethanolamine | 0.1 | ⊚ |
| N-lauryldiethanolamine | 0.1 | ⊚ |
| N-stearyldiethanolamine | 0.2 | ⊚ |
| N,N,N',N'-tetrakis (2-hydroxyethyl) propylenediamine | 0.2 | ⊚ |
| $C_{12}H_{25}NH(C_2H_4O)_5H$ | 0.3 | ⊚ |
| $C_{12}H_{25}N\begin{array}{c}(C_2H_4O)xH\\(C_2H_4O)yH\end{array}$ (x+y=5) | 0.3 | ⊚ |
| $C_{18}H_{37}N\begin{array}{c}(C_2H_4O)xH\\(C_2H_4O)yH\end{array}$ (x+y=10) | 0.3 | ⊚ |
| N,N-diethylethanolamine methacrylate | 0.3 | ⊚ |
| N,N-di-n-butylethanolamine acetate | 0.2 | ⊚ |
| Diethanolamine monolaurate | 0.05 | ⊚ |

COMPARATIVE EXAMPLE 1

A portion of the unsaturated polyester resin obtained in Example 1 was added with a compound as shown in Table 2, thoroughly mixed and poured into the cylinder described previously. The stability of the dispersion of titanium dioxide along the course of time was measured at 40° C as an accelerated test. The results obtained are shown in Table 2.

Table 2.

| Compound | Stability of dispersion of titanium dioxide Amount (PHR) | Rating of stability |
|---|---|---|
| None | 0 | X |
| n-Butylamine | 0.1 | X |
| Triethylamine | 0.1 | X |
| Propylenediamine | 0.1 | XX |
| Dimethylene triamine | 0.2 | XX |
| Adipic acid diamide | 0.1 | XX |
| Urea | 0.1 | X |
| n-Hexylacetylamine | 0.1 | X |
| Ethylene glycol | 0.2 | X |
| Glycerin | 0.2 | XX |
| Ethylene glycol diacetate | 0.1 | X |
| Ethylene glycol monomethyl ether | 0.2 | X |
| Sebacic acid dihydrazide | 0.2 | X |
| Ethylenediaminetetraacetic acid | 0.1 | X |
| n-Butyl-N-bis(2-hydroxyethyl) amide | 0.2 | XX |
| $C_{11}H_{23}CONH(C_2H_4O)_5H$ | 0.3 | XX |
| Sodium dodecylbenzenesulfonate | 0.1 | XX |
| Sodium di-n-butyl phosphate | 0.2 | X |
| Sodium tripolyphosphate | 0.2 | X |
| Triethylammonium chloride | 0.1 | XX |
| $C_{12}H_{25}N\begin{array}{c}+\;\;CH_2CH_2OH\\\;\;\;\;CH_2CH_2OH\\CH_3\end{array}$ .Cl$^-$ | 0.2 | XX |
| Sodium dioctylsulfosuccinate | 0.3 | XX |
| $C_{12}H_{25}O(C_2H_4O)_3SO_3Na$ | 0.5 | XX |
| Soybean lecithin | 0.3 | X |
| Polysodium acrylate | 0.1 | XX |
| Ethyl oleate | 0.2 | X |

Table 2.-continued

| Stability of dispersion of titanium dioxide | | |
|---|---|---|
| Compound | Amount (PHR) | Rating of stability |
| N-Coco-$\beta$-aminobutyric acid | 0.2 | XX |

EXAMPLE 2

The same reactor as in Example 1 was charged with 3,840 parts of granular polyethylene terephthalate isophthalate copolymer waste (terephthalic acid/isophthalic acid = 9:1 by mole) prepared by melting undrawn filament waste (containing 0.5% of titanium dioxide) and then pulverizing the solidified waste, 3,500 parts of diethylene glycol and 1.8 parts of potassium titanyl oxalate. The mixture was reacted in an atmosphere of nitrogen at 220° C for one hour to give a depolycondensation product.

Subsequently, the product thus obtained was cooled to 170° C, mixed homogeneously with 2.7 parts of phosphoric acid, and added with 2,220 parts of phthalic anhydride, 1,470 parts of maleic anhydride and 1.9 parts of hydroquinone. The polyesterification was carried out at 215° C to obtain an unsaturated polyester having an acid value of 9.8. The unsaturated polyester thus obtained was dissolved in styrene containing 0.0020% of hydroquinone to produce a white, turbid unsaturated polyester resin (containing 46% of styrene) having a viscosity of 3.2 poise. Thereafter, the resin thus obtained was mixed with 0.50 PHR of cobalt naphthenate (containing 6.0% of cobalt) to produce an unsaturated polyester resin containing cobalt naphthenate.

A portion of the unsaturated polyester resin containing cobalt naphthenate thus obtained was added with a compound as shown in Table 3, thoroughly mixed and poured into the cylinder described previously. The stability of the dispersion of titanium dioxide along the course of time was measured at 40° C, as an accelerated test. The results obtained are shown in Table 3.

Table 3.

| Stability of dispersion of titanium dioxide | | |
|---|---|---|
| Compound | Amount (PHR) | Rating of Stability |
| None | 0 | XX |
| N-methylethanolamine | 0.1 | |
| N-stearylethanolamine | 0.3 | |
| N-benzylethanolamine | 0.2 | |
| N,N-dimethylethanolamine | 0.05 | |
| N,N-di-sec-butylethanolamine | 0.2 | |
| N,N-dimethyl-3-hydroxypropylamine | 0.2 | |
| Tris (2-hydroxypropyl)amine | 0.1 | |
| N-oleyldiethanolamine | 0.2 | |
| $C_{12}H_{25}N{\diagdown(C_2H_4O)xH \atop (C_2H_4O)yH}$ (x+y=3) | 0.5 | |
| $C_{14}H_{29}N{\diagdown(C_2H_4O)xH \atop (C_2H_4O)yH}$ (x+y=6) | 0.5 | |
| $C_{18}H_{37}N{\diagdown(C_2H_4O)xH \atop (C_2H_4O)yH}$ (x+y=5) | 0.5 | |
| Triethanolamine monolaurate | 0.2 | |
| N-lauryldiethanolamine diacetate | 0.3 | |
| N,N-dimethylethanolamine methacrylate | 0.3 | |
| N,N-diethylethanolamine diacetate | 0.1 | |

EXAMPLE 3

The same reactor as in Example 1 was charged with 3,840 parts of pelletized polyethylene terephthalate waste, prepared by extruding drawn filament waste (containing 0.5% of titanium dioxide), 2,090 parts of propylene glycol and 575 parts of neopentyl glycol. The mixture was reacted in an atmosphere of nitrogen under a pressure of 4.0 kg/cm$^2$ (gauge) at 230° C for three hours to give a depolycondensation product.

Subsequently, the product thus obtained was cooled to 170° C, mixed homogeneously with 4.0 parts of triphenyl phosphate, and added with 3,480 parts of fumaric acid and 1.9 parts of hydroquinone. The polyesterification was carried out at 220° C to obtain an unsaturated polyester having an acid value of 13.9. The unsaturated polyester thus obtained was dissolved in styrene containing 0.0030% of hydroquinone to produce a white, turbid unsaturated polyester resin (containing 45% of styrene) having a viscosity of 2.5 poise.

The unsaturated polyester resin thus obtained was added with a thixotropic agent "Aerosil 200" (a product of Nippon Aerosil Co.) and ethylene glycol as a thixotropic auxiliary agent and thoroughly dispersed by use of a three rolls dispersing apparatus to produce a thixotropic unsaturated polyester resin ($V_{60}$ = 3.2 poise, $V_6/V_{60}$ = 1.8).

A portion of the thixotropic unsaturated polyester resin thus obtained was added with a compound as shown in Table 4, thoroughly mixed and poured into the cylinder described previously. The stability of the dispersion of titanium dioxide along the course of time was measured at 25° C. The results obtained are shown in Table 4.

Table 4.

| Stability of dispersion of titanium dioxide | | |
|---|---|---|
| Compound | Amount (PHR) | Rating of stability |
| None | 0 | X |
| N,N-diethylethanolamine | 0.3 | |
| N,N-di-n-butylethanolamine | 0.3 | |
| N,N-di-n-butyl-2-hydroxypropylamine | 0.3 | |
| N-ethyldiethanolamine | 0.2 | |
| N-lauryl-bis (2-hydroxypropyl)amine | 0.3 | |
| N-myristyldiethanolamine | 0.5 | |
| Triethanolamine | 0.2 | |
| Tris(3-hydroxypropyl)amine | 0.3 | |
| $C_{12}H_{25}N{\diagdown(C_2H_4O)xH \atop (C_2H_4O)yH}$ (x+y=10) | 0.3 | |
| $C_{14}H_{29}N{\diagdown(C_2H_4O)xH \atop (C_2H_4O)yH}$ (x+y=10) | 0.3 | |
| $C_{18}H_{37} \diagdown N-(CH_2)_3-N{\diagdown(C_2H_4O)yH \atop (C_2H_4O)zH}$ $H(OH_4C_2)x \diagup$ (x+y+z=10) | 0.5 | |
| N,N,N',N''-pentakis (2-hydroxypropyl)-diethylenetriamine | 0.3 | |
| N,N-diethyl-3-hydroxypropylamine methacrylate | 0.3 | |
| Diethanolamine dilaurate | 0.3 | |
| Triethanolamine monooleate | 0.3 | |

COMPARATIVE EXAMPLE 2

An unsaturated polyester having an acid value of 12.7 was obtained in the same manner as in Example 1, except that fiber-grade polyethylene terephthalate chip containing no titanium dioxide was used. The unsaturated polyester thus obtained was dissolved in styrene containing 0.0020% of hydroquinone to produce a clear unsaturated polyester resin (containing 52% of styrene) having a viscosity of 1.3 poise.

A portion of 500 g divided from the unsaturated polyester resin thus obtained and 29 g of titanium dioxide (TA-300, a product of Fuji Titanium Industry) were mixed and agitated by using a Cowles Dissolver (Type 1VG) at 3,500 rpm for 15 minutes. To the master batch thus obtained, and remaining portion of the unsaturated polyester resin of the present Comparative Example was added and agitated again for 15 minutes to produce a white, turbid unsaturated polyester resin containing titanium dioxide homogeneously dispersed.

A portion of the unsaturated polyester resin thus obtained was added with a compound as shown in Table 5, thoroughly mixed and poured in the cylinder described previously. The stability of the dispersion of titanium dioxide along the course of time was measured at 40° C as an accelerated test. The results obtained are shown in Table 5.

Table 5.

Stability of dispersion of titanium dioxide

| Compound | Amount (PHR) | Rating of stability |
|---|---|---|
| None | 0 | X |
| N-ethylethanolamine | 0.1 | XX |
| N,N-di-n-butylethanolamine | 0.3 | X |
| N,N-dimethyl-2-hydroxypropylamine | 0.1 | X |
| Diethanolamine | 0.2 | X |
| N-n-butyldiethanolamine | 0.3 | X |
| Triethanolamine | 0.2 | XX |
| N,N,N'N''-pentakis (2-hydroxypropyl) diethylenetriamine | 0.3 | X |
| $C_{14}H_{29}N \begin{matrix} (C_2H_4O)xH \\ (C_2H_4O)yH \end{matrix}$ (x+y=10) | 0.3 | X |
| $C_{18}H_{37}N \begin{matrix} (C_2H_4O)xH \\ (C_2H_4O)yH \end{matrix}$ (x+y=5) | 0.5 | X |
| $C_{12}H_{25}NH(C_2H_4O)_5H$ | 0.3 | XX |
| N,N-diethylethanolamine methacrylate | 0.3 | X |
| N,N-diethylethanolamine diacetate | 0.2 | X |
| N,N-di-n-butylethanolamine acetate | 0.2 | X |
| Triethanolamine monolaurate | 0.2 | XX |

What is claimed is:
1. An unsaturated polyester resin composition containing titanium dioxide comprising:
  1. an unsaturated polyester resin containing titanium dioxide consisting of
    i. an unsaturated polyester containing titanium dioxide obtained from
      a. a depolycondensation product produced by depolycondensing a high molecular weight saturated polyester containing titanium dioxide by using one or more compounds selected from the group consisting of glycols, saturated dibasic acids or anhydrides thereof, unsaturated dibasic acids or anhydrides thereof, and esters or oligoesters thereof, and
      b. other raw materials required for the formation of an unsaturated polyester and
    ii. a copolymerizable monomer and
  2. at least one compound selected from the group consisting of
    A. a hydroxyalkylamine having at least one amino group and at least one hydroxyl group attached to different carbon atoms thereof,
    B. a polyoxyalkyleneamine,
    C. a mono- or dicarboxylate derived from the said compound (A) and
    D. a mono- or dicarboxylate derived from the said compound (B), wherein the amount of addition of the said compound (2) is in the range of from 0.01 to 1% by weight on the basis of the said unsaturated polyester resin.

2. The unsaturated polyester resin composition containing titanium dioxide according to claim 1, wherein the high molecular weight saturated polyester is at least one high molecular weight saturated polyester selected from the group consisting of polyethylene terephthalate, polyethylene terephthalate-isophthalate, polybutylene terephthalate, polyethylene-butylene terephthalate, polyethylene naphthalate and polyethylene terephthalate-naphthalate containing titanium dioxide in an amount of from 0.1 to 2% by weight.

3. The unsaturated polyester resin composition containing titanium dioxide according to claim 1, wherein the copolymerizable monomer is at least one compound selected from the group consisting of styrene, vinyl toluene, divinyl benzene, monochlorostyrene, tert-butyl styrene, α-methyl styrene, methyl acrylate, methyl methacrylate, diallyl phthalate, diallyl isophthalate, diallyl terephthalate, diallyl adipate, diallyl fumarate, dibutyl fumarate, triallylisocyanurate, vinyl acetate and mixtures thereof.

4. The unsaturated polyester resin composition containing titanium dioxide according to claim 1, wherein the hydroxyalkylamine (A) having at least one amino group and at least one hydroxyl group attached to different carbon atoms thereof is at least one compound selected from the group consisting of a monohydroxyalkyl monoamine (i), a polyhydroxyalkyl monoamine (ii), a monohydroxyalkyl polyamine (iii) and a polyhydroxyalkyl polyamine (iv), which are expressed by the following general formulas:

monohydroxyalkyl monoamine (i)
$R^1R^2N—A—OH$, polyhydroxyalkyl monoamine (ii)
$R^1N(—A—OH)_2$, $N(—A—OH)_3$, monohydroxyalkyl polyamine (iii)
$R^1R^2N—B—NR^3—A—OH$, $R^1R^2N—B—NR^3—B—NR^4—A—OH$, polyhydroxyalkyl polyamine (iv)
$R^1R^2N—B—N(—A—OH)_2$, $HO—A—R^1N—B—NR^2—A—OH$, $Ho—A—R^1N—B—N(—A—OH)_2$,
$(HO—A—)_2N—B—N(—A—OH)_2$, $R^1R^2N—B—NR^3—B—N(—A—OH)_2$, $HO—A—R^1N—B—NR^2—B—NR^3—A—OH$, $HO—A—R^1N—B—NR^2—B—N(—A—OH)_2$, $(HO—A—)_2N—B—NR—B—N(—A—OH)_2$, and $(HO—A—)_2N—B—N(—A—OH)—B—N(—A—OH)_2$, wherein $R^1$, $R^2$, $R^3$ and $R^4$ are hydrogen, methyl, ethyl, n-propyl, isopropyl, n-butyl, isobutyl, secbutyl, n-hexyl, n-octyl, 2-ethylhexyl, n-nonyl, n-decyl, lauryl, myristyl, palmityl, stearyl, oleyl, cyclohexyl, benzyl or phenyl, which may be the same or different, A is ethylene, propylene, thimethylene or tetramethylene, and B is ethylene, propylene, trimethylene, tetramethylene, cyclohexylene or phenylene.

5. The unsaturated polyester resin composition containing titanium dioxide according to claim 1, wherein the hydroxyalkylamine (A) having at least one amino group and at least one hydroxyl group attached to different carbon atoms therof is at least one compound selected from the group consisting of ethanolamine, diethanolamine, triethanolamine, tris(2-hydroxypropyl)amine, tris(3-hydroxypropyl)amine, N-methylethanolamine, N-ethylethanolamine, N-n-propylethanolamine, N-isopropylethanolamine, N-n-butylethanolamine, N-sec-butylethanolamine, N-laurylethanolamine, N-stearylethanolamine, N-benzylethanolamine, N,N-dimethylethanolamine, N,N-diethylethanolamine, N,N-di-n-prophyethanolamine, N,N-diisopropylethanolamine, N,N-di-n-butylethanolamine, N,N-di-sec-butylethanolamine, N,N-dilaurylethanolamine, N,N-distearylethanolamine, N,N-dibenzylethanolamine, N,N-dimethyl-2-hydroxypropylamine, N,N-dimethyl-3-hydroxypropylamine, N,N-di-n-propyl-2-hydroxypropylamine, N,N-di-n-butyl-2-hydroxypropylamine, N-methyldiethanolamine, N-ethyldiethanolamine, N-n-propyldiethanolamine, N-isopropyldiethanolamine, N-n-butyldiethanolamine, N-lauryldiethanolamine, N-myristyldiethanolamine, N-oleyldiethanolamine, N-stearyldiethanolamine, N-benzyldiethanolamine, N-lauryl-bis(2-hydroxypropyl)amine, N-stearyl-bis(2-hydroxypropyl) amine, N,N-di-n-butyl-N'-(2-hydroxyethyl)ethylenediamine, N,N-di-n-butyl-N',N'-bis-(2-hydroxypropyl)propylenediamine, N,N,N', N'-tetrakis(2-hydroxyethyl)propylenediamine, and N,N,N'N',N''-pentakis(2-hydroxypropyl)diethylenetriamine.

6. The unsaturated polyester resin composition containing titanium dioxide according to claim 1, wherein the polyoxyalkyleneamine (B) is at least one compound selected from the group consisting of a polyoxyalkylene monoamine (v) and a polyoxyalkylene polyamine (vi) which are expressed by the following general formulas:

polyoxyalkylene monoamine (v)

$R^1R^2N(-A-O)xH$,

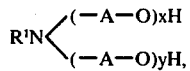

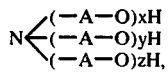

polyoxyalkylene polyamine (vi)

$R^1R^2N-B-NR^3(-A-O)xH$,

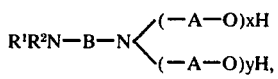

$H(O-A-)xNR^1-B-NR^2(-A-O)yH$,

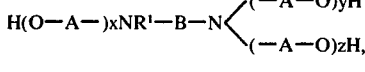

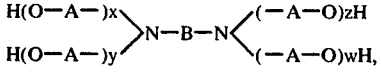

$R^1R^2N-B-NR^3-B-NR^4(-A-O)xH$,

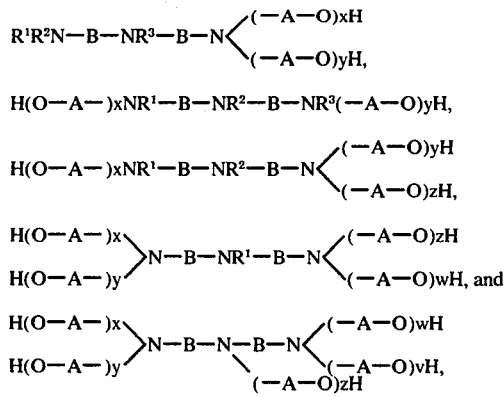

wherein $R^1$, $R^2$, $R^3$ and $R^4$ are hydrogen, methyl, ethyl, n-propyl, isopropyl, n-butyl, isobutyl, secbutyl, n-hexyl, n-octyl, 2-ethylhexyl, n-nonyl, n-decyl, lauryl, myristyl, palmityl, stearyl, oleyl, cyclohexyl, benzyl or phenyl, which may be the same or different, A is ethylene, propylene, trimethylene or tetramethylene, B is ethylene, propylene, trimethylene, tetramethylene, cyclohexylene or phenylene, and x is a number of from 2 to 20 and y, z, w and v are numbers of from 1 to 20, respectively.

7. The unsaturated polyester resin composition containing titanium dioxide according to claim 6, wherein the polyoxyalkylene amine (B) is at least one compound selected from the group consisting of N-n-butyl-N-polyoxyethylene ($x$=2—20) amine, N-lauryl-N-polyoxyethylene ($x$=2—20) amine, N-myristyl-N-polyoxyethylene ($x$=2—20) amine, N-stearyl-N-polyoxyethylene ($x$=2—20) amine, N-N-di-n-butyl-N-polyoxyethylene ($x$=2—20)amine, N,N-dilauryl-N-polyoxyethylene ($x$=2—20) amine, N,N-distearyl-N-polyoxyethylene ($x$=2—20) amine, N-n-butyl-N,N-bis(polyoxyethylene) ($x+y$=3—20) amine, N-lauryl-N,N-bis(-polyoxyethylene) ($x+y$=3—20) amine, N-myristyl-N,N-bis(polyoxyethylene) ($x+y$=3—20) amine, N-palmityl-N,N-bis(polyoxyethylene) $x+y$=3—20) amine, N-stearyl-N,N-bis (polyoxyethylene) ($x+y$=3—20) amine, N-stearyl-N-polyoxyethylene-N',N'-bis(polyoxyethylene) ($x+y+z$=4—20) trimethylenediamine, N,N,N',N'-tetrakis(polyoxyethylene) ($x+y+z+w$=5—20) propylenediamine, N,N,N',N',N''-pentakis(polyoxyethylene) ($x+y+z+w+v$=6—20) diethylenetriamine, N-lauryl-N-polyoxypropylene($x$=2—20) amine, N-lauryl-N,N-bis(polyoxypropylene) ($x+y$=3—20) amine, N-stearyl-N,N-bis (polyoxypropylene) ($x+y$=3—20) amine, N-lauryl-N-polyoxypropylene-N',N'-bis(-polyoxypropylene) ($x+y+z$=4—20) trimethylenediamine, and N,N,N',N',N''-pentakis(polyoxypropylene) ($x+y+z+w+v$=6—20) diethylenetriamine.

8. The unsaturated polyester resin composition containing titanium dioxide according to claim 1, wherein the mono- or dicarboxylate (C) derived from the hydroxyalkylamine (A) having at least one amino group and at least one hydroxy group attached to different carbon atoms thereof and the mono- or dicarboxylate (D) derived from the polyoxyalkyleneamine (B) are compounds in which at least one free hydroxyl group of the said compounds (A) and (B) is esterified with at least one organic acid selected from the group consisting of acetic acid, propionic acid, butyric acid, caproic acid, 2-ethylcaproic acid, caprylic acid, lauric acid, myristic acid, palmitic acid, stearic acid, oleic acid, linoleic acid, acrylic acid, methacrylic acid, succinic acid, adipic acid and sebacic acid.

9. The unsaturated polyester resin composition containing titanium dioxide according to claim 1, wherein the mono- or dicarboxylate (C) derived from the hydroxyalkylamine (A) having at least one amino group and at least one hydroxyl group attached to different carbon atoms thereof is at least one compound selected from the group consisting of diethanolamine monoacetate, diethanolamine dilaurate, triethanolamine monoacetate, triethanolamine monolaurate, triethanolamine monooleate, N,N-dimethylethanolamine acrylate, N,N-dimethylethanolamine methacrylate, N,N-diethylethanolamine diacetate, N,N-diethylethanolamine acrylate, N,N-diethylethanolamine methacrylate, N,N-diethyl-3-hydroxyproplamine acrylate, N,N-diethyl-3-hydroxypropylamine methacrylate, N,N-di-n-butylethanolamine acetate, N,N-di-n-butylethanolamine laurate, N,N-di-n-butylethanolamine adipate, N-n-butyldiethanolamine diacetate, N-n-butyldiethanolamine monolaurate, and N-lauryldiethanolamine diacetate.

10. The unsaturated polyester resin composition containing titanium dioxide according to claim 1, wherein the mono- or dicarboxylate (D) derived from the polyoxyalkyleneamine (B) is at least one compound selected from the group consisting of N-lauryl-N-polyoxyethylene ($x$=2–20) amine acetate, N-lauryl-N-polyoxypropylene ($x$=2–20) amine acetate, N-lauryl-N,N-bis(polyoxyethylene) ($x+y$=3−20) amine diacetate and N-stearyl-N,N-bis(polyoxyethylene) ($x+y$=3−20) amine diacetate.

11. A molded product manufactured from the unsaturated polyester resin composition containing titanium dioxide as defined in claim 1.

12. The unsaturated polyester resin composition containing titanium dioxide according to claim 1, wherein the unsaturated polyester is obtained from (a) a depolycondensation product produced by depolycondensing a high molecular weight saturated polyester containing titanium dioxide in an amount of from 0.1 to 2% by weight by the use of one or more glycols and (b) an unsaturated dibasic acid or an anhydride thereof.

13. The unsaturated polyester resin composition containing titanium dioxide according to claim 12, wherein the glycol is at least one compound selected from the group consisting of ethylene glycol, propylene glycol, 1,3-propane diol, diethylene glycol, dipropylene glycol, 1,3-butylene glycol, 1,4-butane diol, 1,6-hexane diol, neopentyl glycol, cyclohexane dimethanol, 2,2,4-trimethyl-1,3-pentane diol, hydrogenated bisphenols, alkylene oxide addition products of bisphenols and alkylene oxide addition products of hydrogenated bisphenols.

14. The unsaturated polyester resin composition containing titanium dioxide according to claim 12, wherein the unsaturated dibasic acid is at least one compound selected from the group consisting of maleic acid, maleic anhydride, fumaric acid, itaconic acid and citraconic acid.

15. The unsaturated polyester resin composition containing titanium dioxide according to claim 6, wherein the sum of $x, y, z, w,$ and $v$ is a number of from 2 to 20.

* * * * *